United States Patent [19]

Oviatt

[11] Patent Number: 5,502,918
[45] Date of Patent: Apr. 2, 1996

[54] MOUSETRAP FOR CATCHING MICE LIVE

[76] Inventor: Bill Oviatt, 1375 Highway 71 North, Springdale, Ark. 72764

[21] Appl. No.: 347,890

[22] Filed: Dec. 1, 1994

[51] Int. Cl.⁶ .................................................. A01M 23/02
[52] U.S. Cl. .................................. 43/61; 43/60; 43/66
[58] Field of Search ................................ 43/66, 67, 61, 43/60, 58, 75

[56] References Cited

U.S. PATENT DOCUMENTS 944,926  12/1909  Turnbo ..................................... 43/66
1,226,641  5/1917  Cushing .................................. 43/60
4,768,305  9/1988  Sackett .................................. 43/61

Primary Examiner—Kurt Rowan
Attorney, Agent, or Firm—Rick Martin

[57]  ABSTRACT

A "Y" shaped mousetrap lures a mouse into an open end of the "Y" by means of smelly bait located at a closed end of the bottom of the "Y". The "Y" is pivotally supported horizontally by a stand. As the mouse walks past the pivot point, a ping pong ball rolls from the opposite short "Y" tube member and down to the entrance of the open ended tube member. The mouse is trapped alive and can be drowned by immersing the mousetrap.

8 Claims, 3 Drawing Sheets

1

MOUSETRAP FOR CATCHING MICE LIVE

FIELD OF INVENTION

The present invention relates to a better mousetrap.

BACKGROUND OF THE INVENTION

Mice can be a nuisance and/or a health menace. Traditional mousetraps are comprised of either a mechanical or chemical killing means. When a mouse is killed in a household, many health problems can arise. These health problems include the release of body fluids containing viruses inside the household. Parasites including worms or lice can be released. Decomposition bacteria will cause odors and cause injury to pets or children who ingest them.

The present invention eliminates these hazards by catching the mouse alive. A simple, cylindrical, teeter-totter contains bait at a closed end of the cylinder. The mouse enters the open end of the cylinder and walks toward the bait. As the mouse passes a fulcrum the cylinder tilts the bait end of the cylinder downward. The mouse becomes trapped by a downward rolling ping pong ball. The trap containing the trapped mouse can be brought outside where the entire trap can be thrown in a bucket to drown the mouse.

SUMMARY OF THE INVENTION

The main object of the present invention is to trap a mouse alive.

Another object of the present invention is to provide an inexpensive trap.

Yet another object of the present invention is to allow the trap to be easily dropped into a bucket of water to drown the mouse.

Still yet another object of the present invention is to reuse the trap.

Other objects of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
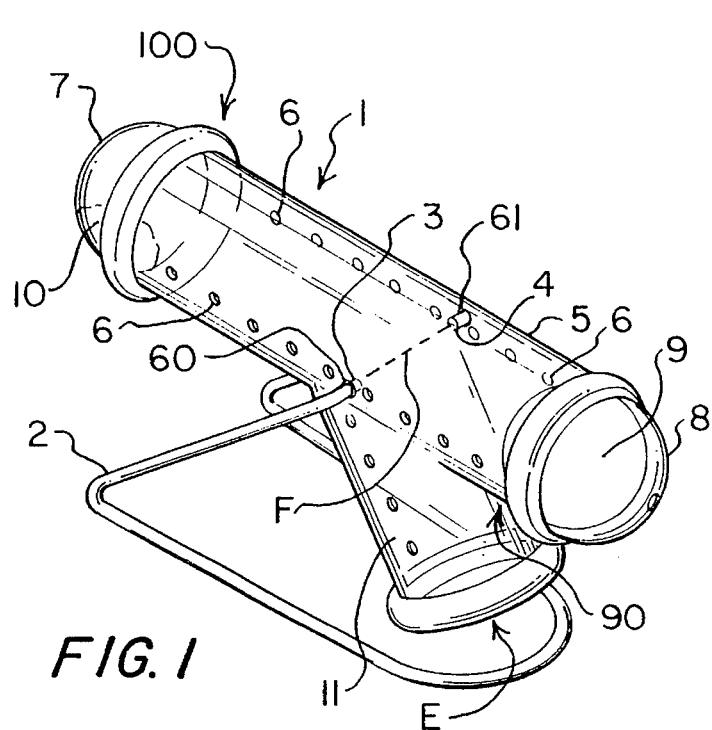
FIG. 1 is a top perspective view of the preferred embodiment.

Referring first to FIG. 1 the trap 1 is comprised of a support stand 2 preferably made of wire. Support stand 2 has wire ends 3, 4 which form a fulcrum for the main tube 5. Main tube 5 preferably is a plastic cylinder having holes 6, 60, 61. Holes 60, 61 removably attach to the wire ends 3, 4 thereby permitting the main tube 5 to teeter-totter around the fulcrum F. Holes 6 also provide an entrance for water when the trap 1 is immersed to kill a mouse.

A pair of removable end caps 7, 8 seal the ends of main tube 5. Before the end caps 7, 8 are secured to main tube 5, the bait 10 and the ping pong ball 9 are inserted as shown at bait end 100 and ball end 90.

An entrance tube 11 forms a "Y" with the main tube 5. Entrance tube 11 depends downward from main tube 5 and points away from the bait end 100.

Figure 2:
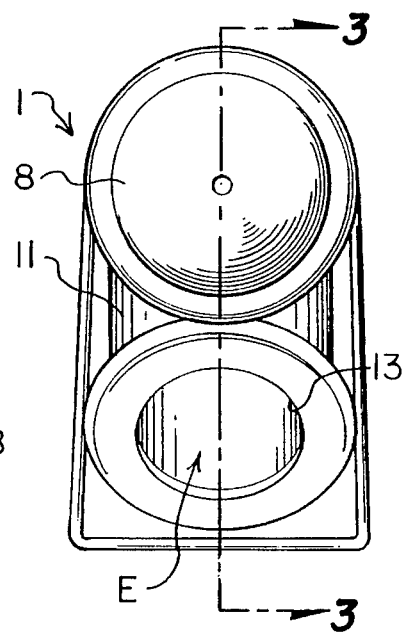
FIG. 2 is a front plan view of the preferred embodiment shown in FIG. 1.
Figure 3:
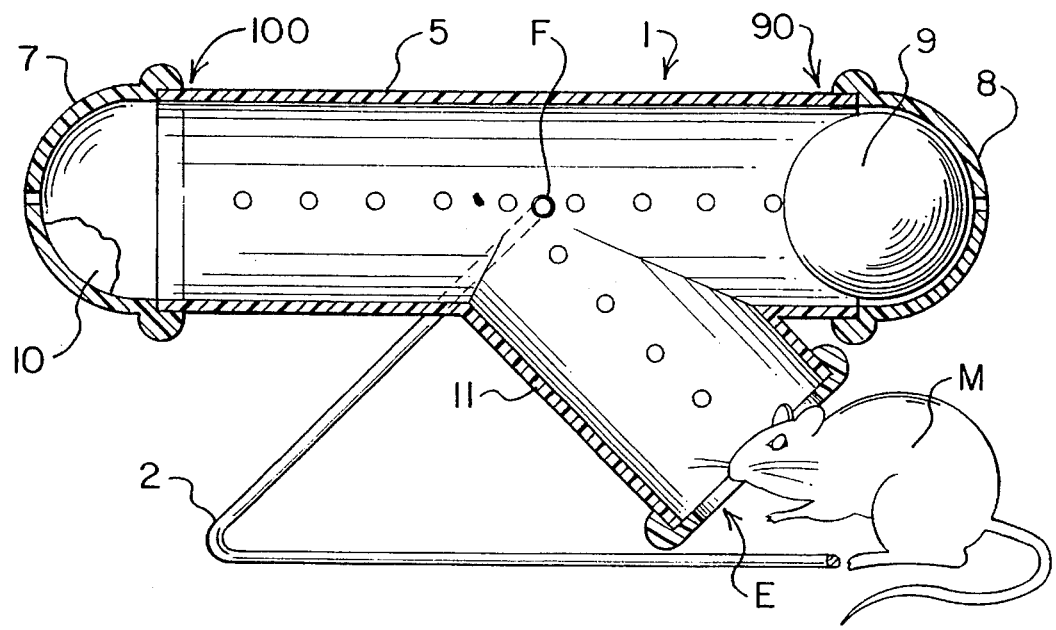
FIG. 3 is a longitudinal sectional view taken along line 3—3 of FIG. 2.

FIG. 2 shows a mouse eye view of the trap 1. The lure of the bait 10 emanates from entrance E. In FIG. 3 the mouse M is entering entrance E of entrance tube 11. The main tube 5 is in the loaded position which is horizontal. Thus, the ping pong ball 9 rests at ball end 90.

Figure 4:
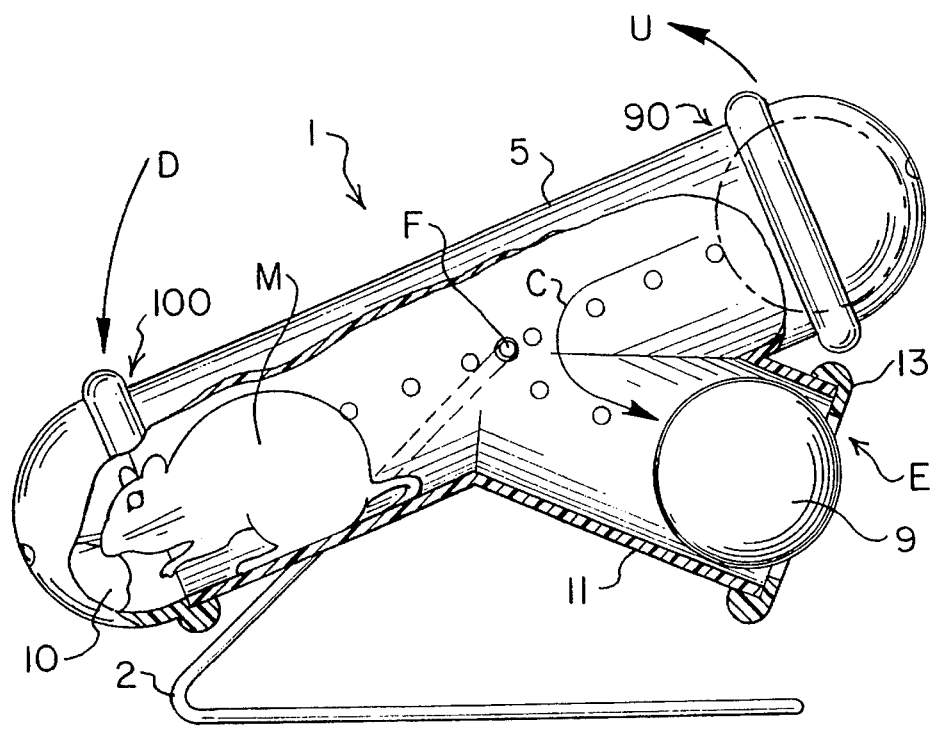
FIG. 4 is a side plan view with a partial cut-away showing the mouse of FIG. 3 trapped.

Referring next to FIG. 4 the mouse M has had it. He's eating the bait 10. But as he walked past the fulcrum F his weight caused the main tube 5 to pivot around fulcrum F so that the bait end 100 fell down in direction D and the ball end 90 rose up in direction U. The ping pong ball 9 urged by gravity rolled in path C to close the entrance E. A rim 13 prevents the ping pong ball 9 from rolling past the entrance E.

When finished eating mouse M will turn around and walk past fulcrum F. Main tube 5 will teeter back to a horizontal position. However, ping pong ball 9 will prevent the egress of mouse M out of entrance E. All mouse M can do is travel back and forth in main tube 5 and entrance tube 11, thereby causing the trap 1 to teeter-totter around fulcrum F. Trap 1 can then be immersed in water to drown mouse M or opened at end caps 7, 8 to release mouse M. Of course, in an alternate use one could kill mouse M with poison bait and trap him in the same manner.

Figure 6:
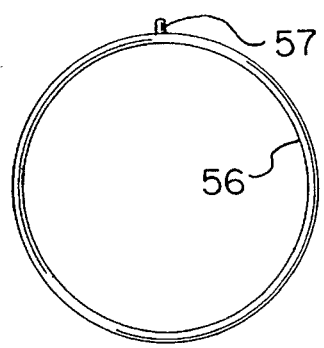
FIG. 6 is a front plan view of the retaining ring of FIG. 5.
Figure 7:
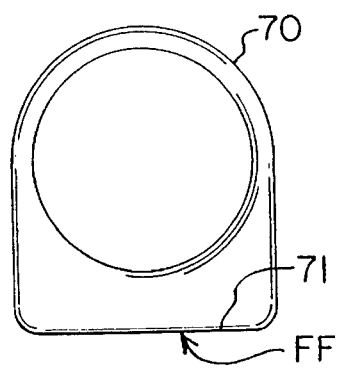
FIG. 7 is a front plan view of the pivot stand of FIG. 5.
Figure 5:
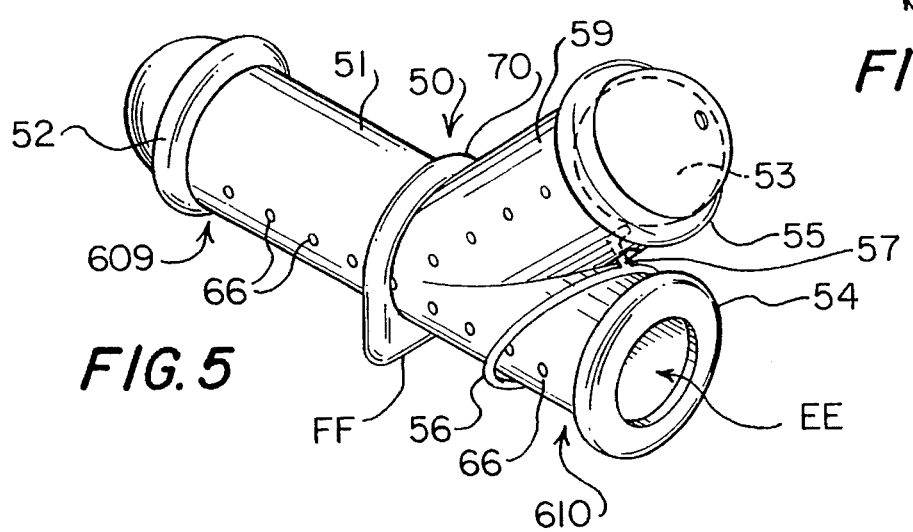
FIG. 5 is a top perspective view of an alternate embodiment.

Referring next to FIGS. 5, 6, 7a trap 50 is shown. FIG. 5 shows the trap 50 in the horizontal loaded position. In this alternate embodiment a main tube 51 teeter-totters around fulcrum FF. Preferably a plastic ring 70 has a flat base 71 which acts as fulcrum FF. The entrance EE is at the entrance end 610 of the main tube 51. A removable cap 52 seals the bait end 609 of the main tube 51. Holes 66 can allow water to enter main tube 51 during immersion.

The trapping mechanism is comprised of a retaining tube 59 forming a "Y" with the main tube 51. Retaining tube 59 rises obliquely from main tube 51 away from the bait end 609 of the main tube 51. The ping pong ball 53 is held up in the load position by retaining prong 57 of swivel ring 56.

Figure 8:
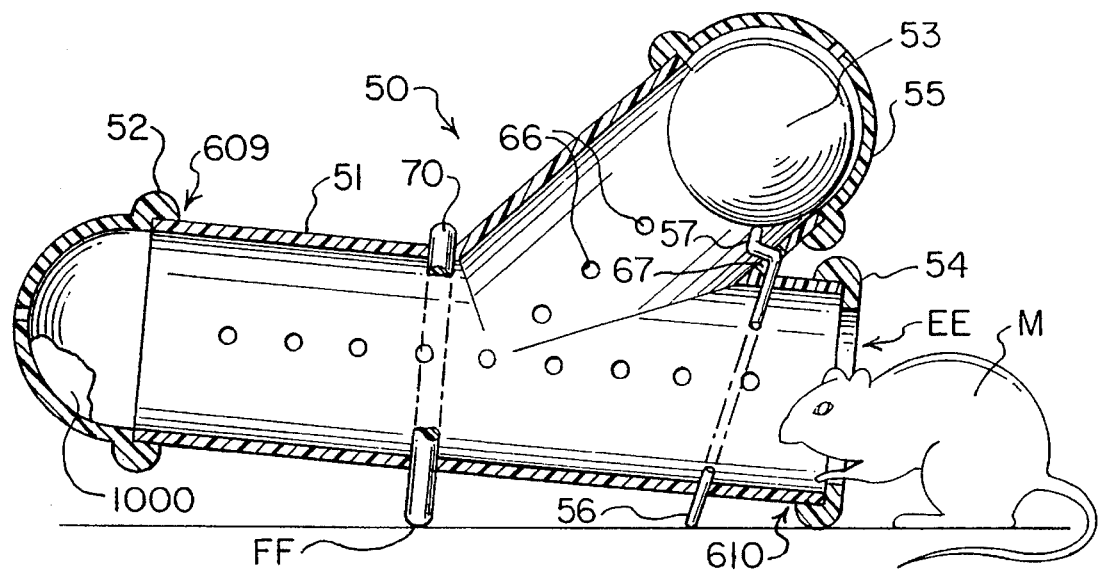
FIG. 8 is a longitudinal partial sectional view of the embodiment of FIG. 5 in the process of trapping a mouse.
Figure 9:
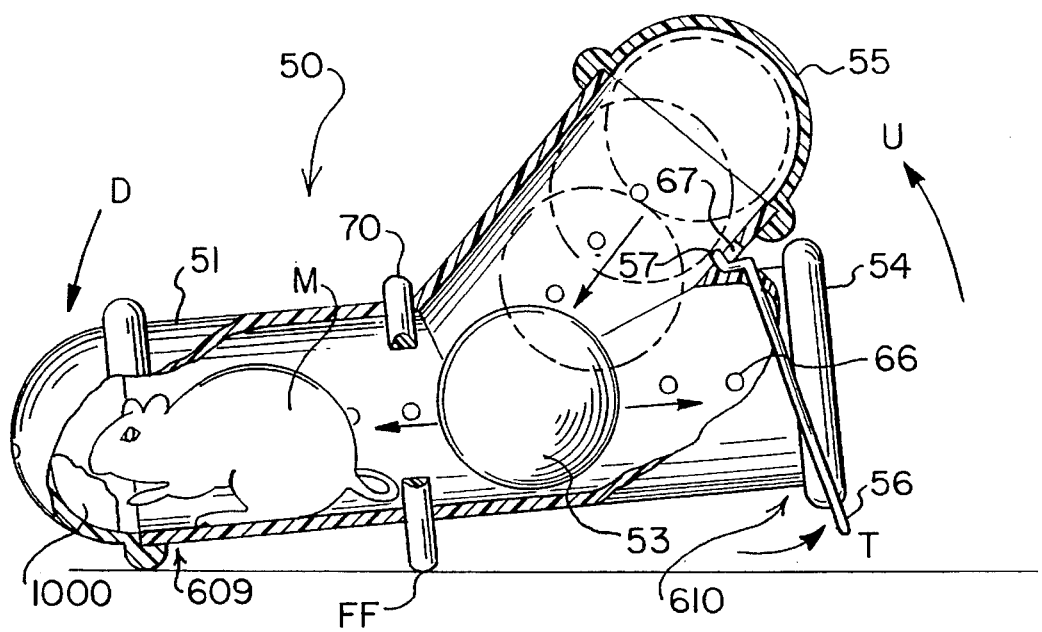
FIG. 9 is a partial cut-away of the embodiment shown in FIG. 8 having caught the mouse.

Referring last to FIGS. 8, 9 mouse M is first entering in FIG. 8 entrance EE. The swivel ring 56 is resting on the ground in the cocked position. The retaining prong 57 is pivotally supported in hole 67. Retaining prong 57 is holding up the ping pong ball 53.

When the mouse M passes the fulcrum FF he becomes trapped. The main tube 51 teeters so that the bait end 609 falls in direction D, and the entrance end 610 rises in direction U. The swivel ring 56 pivots in direction T because the prong 57 is urged downward by ping pong ball 53. Hole 67 acts as a fulcrum. The ping pong ball 53 is restrained from exiting entrance EE by rim 54. End caps 52, 55 prevent the mouse's egress.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A mousetrap comprising:
   a main tube having a central fulcrum means, a bait end, and a ball end;
   a base stand having a means to support the main tube at the fulcrum;
   said bait end further comprising mouse bait and a main tube closure;
   said ball end further comprising a ball and a main tube closure;
   an entrance tube depending down from the main tube at the central fulcrum means, and angled toward the ball end;
   said entrance tube having a mouse entrance adjacent a supporting surface for the base stand; and
   said main tube having a horizontal load position wherein said ball rests at the ball end, wherein a mouse enters the mouse entrance, walks toward the bait up the entrance tube, and passes the fulcrum means, thereby causing the main tube to teeter down at the bait end, and cause the ball to roll down the main tube then down the entrance tube, functioning to block an egress of the mouse out the mouse entrance.

2. The mousetrap of claim 1 wherein said central fulcrum means further comprise holes in the main tube.

3. The mousetrap of claim 2 wherein said means to support further comprises a pair of prong ends fittingly engaged in the holes in the main tube.

4. The mousetrap of claim 1 wherein the ball further comprises a ping pong ball.

5. The mousetrap of claim 3 wherein said central fulcrum means further comprises a support stand depending from the main tube.

6. A mousetrap comprising:
   a main tube having a closed bait end, a mouse entrance end, and a central fulcrum means supporting the main tube on a support surface;
   a ball tube angularly rising from the main tube;
   said ball tube further comprising a closure, a ball, and a ball support means, functioning to hold the ball against the closure when the main tube is teetered in a cocked position;
   a bait in the bait end, functioning to lure a mouse into the mouse entrance, past the central fulcrum means, thereby causing the main tube to teeter downward at the bait end, and causing the ball support means to release the ball to roll into the main tube and thereby block an egress of the mouse out the mouse entrance.

7. The mousetrap of claim 5 wherein said ball support means further comprises a swivel ring suspended from a hole in the ball tube by a prong, wherein said prong swings away from the ball, thereby releasing it when the main tube is teetered downward at the bait end.

8. A mousetrap comprising:
   a "Y" shaped tube pivotally supported at a center point by a stand;
   said "Y" shaped tube having a straight tube closed at both ends, and having bait at one end, and a ball at an opposing ball end, said ball end being adjacent to an open tube member;
   said open tube member depending from the straight tube so as to form a mouse entrance when the straight tube is suspended horizontally, whereby a mouse attracted by a bait at the bait end passes the center point and causes the straight tube to teeter with the bait end down, thereby causing the ball to travel to the open tube member, thus trapping the mouse.

\* \* \* \* \*